(12) United States Patent
Yoakum (10) Patent No.: US 8,479,272 B2
(45) Date of Patent: Jul. 2, 2013

(54) IDENTITY ASSERTION

(75) Inventor: John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 920 days.

(21) Appl. No.: 11/961,783

(22) Filed: Dec. 20, 2007

(65) Prior Publication Data

US 2008/0301788 A1 Dec. 4, 2008

Related U.S. Application Data

(60) Provisional application No. 60/941,724, filed on Jun. 4, 2007.

(51) Int. Cl.
H04L 29/06 (2006.01)

(52) U.S. Cl.
USPC .................................. 726/7; 726/4; 713/168

(58) Field of Classification Search
None
See application file for complete search history.

(56) References Cited

U.S. PATENT DOCUMENTS

| | | | |
|---|---|---|---|
| 6,714,944 B1 | 3/2004 | Shapiro et al. | |
| 6,988,075 B1 | 1/2006 | Hacker | |
| 7,275,259 B2 * | 9/2007 | Jamieson et al. | 726/8 |
| 7,748,032 B2 * | 6/2010 | Simmons | 726/10 |
| 8,112,789 B2 * | 2/2012 | Halls et al. | 726/4 |
| 8,255,989 B2 * | 8/2012 | Medvinsky et al. | 726/19 |
| 2001/0032100 A1 | 10/2001 | Mahmud et al. | |
| 2003/0188193 A1 * | 10/2003 | Venkataramappa | 713/201 |
| 2004/0139319 A1 | 7/2004 | Favazza et al. | |
| 2005/0132189 A1 * | 6/2005 | Katsube et al. | 713/168 |
| 2005/0154664 A1 | 7/2005 | Guy et al. | |
| 2006/0018520 A1 | 1/2006 | Holloran | |
| 2006/0107311 A1 * | 5/2006 | Dawson et al. | 726/5 |
| 2006/0123465 A1 | 6/2006 | Ziegler | |
| 2006/0137001 A1 * | 6/2006 | Foster et al. | 726/10 |
| 2006/0248593 A1 | 11/2006 | Dennis et al. | |
| 2007/0078687 A1 | 4/2007 | Dettinger et al. | |
| 2007/0107048 A1 * | 5/2007 | Halls et al. | 726/4 |
| 2007/0156692 A1 | 7/2007 | Rosewarne | |
| 2007/0192137 A1 | 8/2007 | Ombrellaro | |

(Continued)

FOREIGN PATENT DOCUMENTS

| CA | 2524294 A1 | 11/2004 |
|---|---|---|
| WO | 2007/047183 A2 | 4/2007 |
| WO | 2007/061946 A2 | 5/2007 |

OTHER PUBLICATIONS

International Search Report for PCT/IB2008/001186, mailed Sep. 30, 2008.

(Continued)

*Primary Examiner* — Nathan Flynn
*Assistant Examiner* — Michael R Vaughan
(74) *Attorney, Agent, or Firm* — Withrow & Terranova, PLLC (57) ABSTRACT

The present invention relates to using authorization information provided by an asserting agent to control identity-related interactions between a receiving agent and an identity agent, which acts on behalf of the asserting agent. The authorization information may be provided to the identity agent directly or through the receiving agent. When the asserting agent is asserting the identity of an associated entity to the receiving agent, the asserting agent delivers assertion information, which may but need not include the authorization information, to the receiving agent. The assertion information includes claim information that includes actual claims or identifies available claims. Upon receiving the assertion information, the receiving agent may interact with the identity agent. The identity agent will use the authorization information to control claim-related interactions with the receiving agent.

29 Claims, 6 Drawing Sheets

U.S. PATENT DOCUMENTS

2008/0155267 A1* 6/2008 Lieber ............................ 713/183
2008/0222038 A1 9/2008 Eden et al.
2009/0043691 A1 2/2009 Kasower
2009/0293099 A1* 11/2009 Yoakum ............................ 726/1
2012/0117634 A1* 5/2012 Halls et al. ........................ 726/7

OTHER PUBLICATIONS

International Search Report for PCT/IB2009/005663, mailed Sep. 8, 2009.

* cited by examiner

IDENTITY ASSERTION

This application claims the benefit of U.S. provisional application Ser. No. 60/941,724 filed Jun. 4, 2007, the disclosure of which is incorporated herein by reference in its entirety.

FIELD OF THE INVENTION

The present invention relates to an entity's identity, and in particular to controlling the assertion of an entity's identity.

BACKGROUND OF THE INVENTION

The identity of an entity, such as a person, system, or object, relates to attributes or information that is particularly unique to that person, system, or object. The identity of an entity is often maintained through information that is provided from any number of identity authorities, such as local, state, and federal governments. Other institutions, such as financial institutions, may have similar information that is unique to a particular entity, and may help identify a particular entity. Regardless of how identity information is created or who creates the identity information, it becomes more and more important to protect identity information and keep identity information out of the wrong hands. The evolution of the Internet and electronic commerce requires more and more frequent exchanges of vulnerable identity information. When identity information lands in the wrong hands, identity thieves can readily step into the identity of another, and conduct themselves as such in our electronic society.

Given the damage that can occur when an identity is stolen, and the difficulty in recovering from a stolen identity, there is a continuing need for techniques to protect an entity's identity, yet allow the entity to fully participate in our electronic society. In particular, there is a need to avoid maintaining extensive identity information on portable electronic devices, which are often lost, thereby leaving valuable identity information readily accessible. There is a further need to minimize or limit the amount of identity information that is transferred over the Internet or like communication networks in association with communication sessions or electronic transactions.

SUMMARY OF THE INVENTION

The present invention relates to using authorization information provided by an asserting agent to control identity-related interactions between a receiving agent and an identity agent, which acts on behalf of the asserting agent. The authorization information may be provided to the identity agent directly or through the receiving agent. When the asserting agent is asserting the identity of an associated entity to the receiving agent, the asserting agent delivers assertion information, which may but need not include the authorization information, to the receiving agent. The assertion information includes claim information that is related to one or more claims, which define attributes of or facts about the entity and relate to the identity of the entity or unique information associated with the entity. The claim information may include the actual claims or identify available claims. Upon receiving the assertion information, the receiving agent may interact with the identity agent. In one embodiment, the receiving agent interacts with the identity agent to verify certain claims associated with the entity. In another embodiment, the receiving agent requests claims associated with the entity from the identity agent. The identity agent will use the authorization information to control claim-related interactions with the receiving agent.

The authorization information may limit the ability of the identity agent to interact with the receiving agent according to different criteria. The authorization information may limit the number of interactions with the receiving agent or authorize interactions for a certain time period. For example, the authorization information may only allow one interaction between the identity agent and the receiving agent, where a given interaction may require multiple exchanges between the identity agent and the receiving agent to facilitate an interaction. Alternatively, the authorization information may only allow such interactions for a 24-hour period prior to expiring, or for any interactions for a given session between the asserting agent and the receiving agent.

The authorization information may only allow interactions within a given context. As such, interactions between the identity agent and receiving agent may be limited to a given purpose or in association with a certain type of session between the asserting agent and the receiving agent. For example, only those of the entity's claims that relate to a defined purpose and are stored on the identity agent are made available to the receiving agent. The given context may correspond to interactions with a receiving agent or receiving agents that are associated with a certain entity or defined group of entities.

The authorization information may limit the interaction between the identity agent and the receiving agent based on any combination of the above or other criteria. For example, the authorization information may be provided for a single use, within a set amount of time, for a single interaction, and within a defined context. The context may directly or indirectly identify a specific receiving agent or purpose for which the authorization information is pertinent. Those skilled in the art will recognize numerous ways in which the authorization information may be configured to limit interactions between the identity agent and any number of receiving agents.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
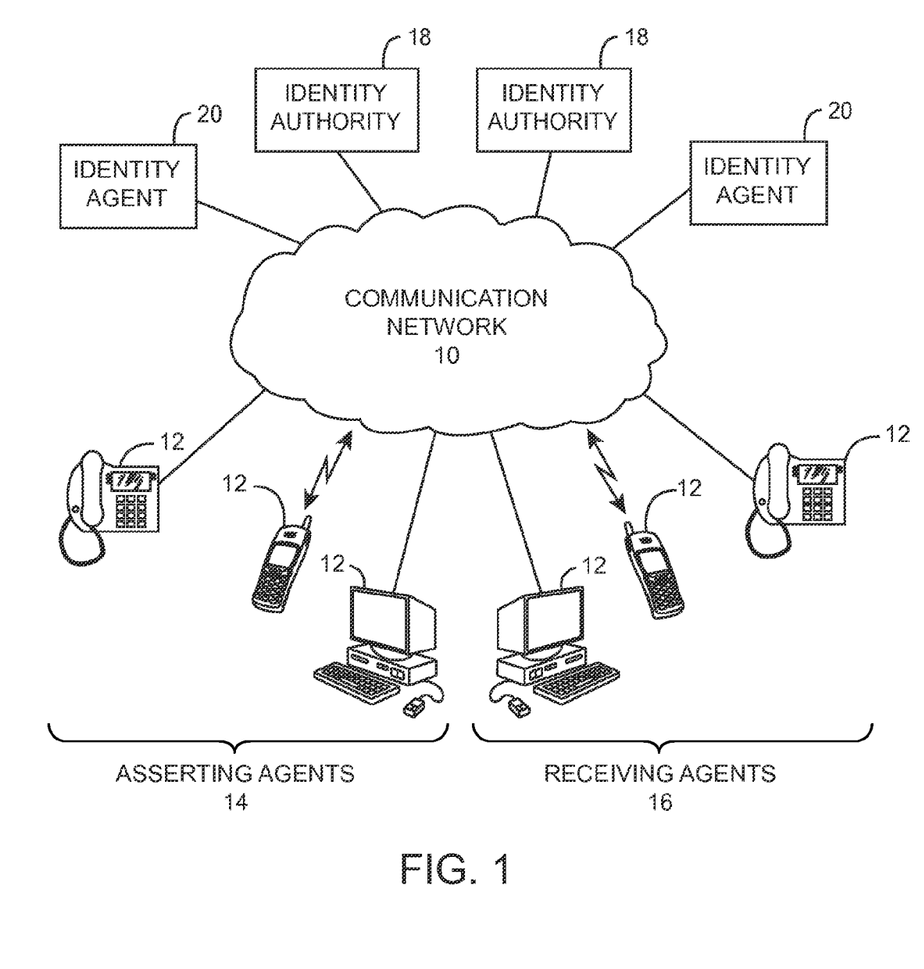
FIG. 1 is a block representation of a communication environment according to one embodiment of the present invention.

In many instances, it is desirable to assert the identity of an entity from one device to another in an effort to establish a level of trust between the two devices or entities associated therewith. A device that is asserting the identity of an associated entity is referred to as an asserting agent, while a device to which the entity's identity is being asserted is referred to as a receiving agent. With reference to FIG. 1, a communication environment is illustrated to include a communication network 10, which supports communications between various user terminals 12, such as fixed telephone terminals, mobile telephone terminals, and personal computers. Any user terminal 12 may be an asserting agent 14 or a receiving agent 16 for a given situation. An entity may represent a person that is associated with a user terminal 12; a system, such as a user terminal 12, server, computer, or web site; an object, or the like. Accordingly, an asserting agent 14 or receiving agent 16 may be a function that runs on a device that represents the entity. Alternatively, the entity may be a person, system, or object, and the asserting agent 14 or receiving agent 16 may be a device or function running on a device that is associated with the person, system, or object.

The identity for an entity may be defined by one or more claims. In some situations, claims are provided in a credential. Claims correspond to attributes of or facts about the entity and relate to the entity's identity or unique information associated with the entity. A credential is a mechanism for associating a select group of claims for an entity and may be provided by an appropriate authority, which is referred to as an identity authority 18. For example, a driver's license or passport is a credential, and information thereon, such as the document number, social security number, age, height, expiration date, residence information, citizenship, biometric information, and the like may represent claims for the respective credentials. Credit or debit cards may also be considered credentials, where the associated card numbers, expiration dates, and security codes are claims of the credit cards. Another credential example includes web certificates that are used for verifying the identity of web servers and the like.

In essence, an asserting agent 14 asserts the identity of an associated entity such that a receiving agent 16 can determine to a desired level of confidence that the asserting agent 14 or associated entity is who they say they are. Once this determination is made, the asserting agent 14 and the receiving agent 16 may establish a session or provide certain communications over an established session. When asserting the identity of an entity, the asserting agent 14 may take some action to have certain of the entity's claims delivered to the receiving agent 16, which will process the claims to determine if and how to interact with the asserting agent 14. In many cases, the receiving agent 16 uses the claims to determine with sufficient certainty that the entity associated with the asserting device corresponds to the identity being asserted. Based on such determination, the receiving agent 16 may determine whether to interact with the asserting agent 14, how to interact with the asserting agent 14, or both.

As noted, asserting the identity of an entity involves presenting one or more claims of the entity to a receiving agent 16, which may process the claims to determine whether to engage the asserting agent 14. The claims may be presented to the receiving agent 16 directly by the asserting agent 14 as well as indirectly by an identity agent 20, which acts on behalf of the asserting agent 14. The identity agent 20 will have a trustworthy relationship with the asserting agent 14, and may be configured to store certain claims and related information of the entity associated with asserting agent 14 and provide such information to the receiving agent 16 upon request. The identity agent 20 may also be configured to verify certain information, such as claims, credentials, or related information of the entity for the receiving agent 16.

In one embodiment, the identity agent 20 may store claims of the entity as well as be configured to verify information of the entity based on certain of the entity's claims, prior to an identity assertion by the asserting agent 14. In response to an identity assertion, the receiving agent 16 may obtain certain of the claims of the entity from the identity agent 20, have the identity agent 20 verify information of the entity based on claims that were received from the asserting agent 14 by the receiving agent 16, or both.

Accordingly, the receiving agent 16 may interact with the identity agent 20 in various ways in response to the asserting agent 14 asserting the identity of an associated entity to the receiving agent 16. For the present invention, the asserting agent 14 must authorize some or all interactions between the identity agent 20 and the receiving agent 16 in association with an identity assertion by the asserting agent 14 to the receiving agent 16. In particular, the asserting agent 14 will provide authorization information, which governs the interactions that are appropriate between the identity agent 20 and the receiving agent 16. The authorization information may be passed directly to the identity agent 20 or may be sent to the receiving agent 16, which will provide the authorization information to the identity agent 20. Regardless of how the authorization information is received from the asserting agent 14, the identity agent 20 will use the authorization information to control interactions with the receiving agent 16.

The authorization information may limit the ability of the identity agent 20 to interact with the receiving agent 16 according to different criteria. The authorization information may limit the number of interactions with the receiving agent 16 or authorize interactions for a certain time period. For example, the authorization information may only allow one interaction between the identity agent 20 and the receiving agent 16, where a given interaction may require multiple exchanges between the identity agent 20 and the receiving agent 16 to facilitate a given interaction. Alternatively, the authorization information may only allow such interactions for a 24-hour period prior to expiring or for any interactions for a given session between the asserting agent 14 and the receiving agent 16.

The authorization information may only allow interactions within a given context. As such, interactions between the identity agent 20 and receiving agent 16 may be limited to a given purpose or in association with a certain type of session between the asserting agent 14 and the receiving agent 16. For example, only those of the entity's claims that relate to a defined purpose for the interaction or session and are stored on the identity agent 20 are made available to the receiving agent 16. The given context may correspond to interactions with a particular receiving agent 16 or receiving agents 16 that are associated with a certain entity or defined group of entities. For example, the authorization information may dictate that only interactions for credit card authorizations or secured video conferences are allowed in general or for a particular entity. The authorization information may limit the interaction between the identity agent 20 and the receiving agent 16 based on any combination of the above or other criteria. As another example, the authorization information may be provided for a single use, within a set amount of time, for a single interaction, and within a defined context. As noted, the context may directly or indirectly identify a specific receiving agent 16 or purpose for which the authorization information is pertinent.

In another embodiment, the authorization information may dictate how much information, including credentials or claims, of the entity may be provided to a receiving agent 16 in general, or within a given context. For example, if the context is a credit card transaction that requires a valid government-issued ID that has a name corresponding to the name on the credit card, the information provided to the receiving agent 16 may merely indicate that a valid government-issued ID that matches the credit card does exist, but not send all of the claims associated with the government-issued ID. Only the claims corresponding to the credit card information and the indication that the government-issued ID exists need to be provided to the receiving agent 16. As such, the important identity information is secured, and only such information that is necessary or required is provided to the receiving agent 16. In another example, assume that a session cannot be established with someone who is under 21 years of age. For an identity assertion for an entity who is 32, the identity agent 20 may be instructed using the appropriate authorization information to only respond to age requests by indicating that the entity is over 21, instead of providing the exact birth date and other confidential claims that are often associated with a credential that provides such information. Accordingly, social security numbers, driver's license numbers, or passport numbers may be maintained in confidence, yet the receiving agent 16 is able to confirm that the entity is over 21 for a given session, which may relate to purchasing alcohol or accessing certain media content.

With the present invention, the use of the identity agent 20 and allowing the asserting agent 14 to control the identity agent 20 allows an entity to maintain complete control over the identity agent 20. In certain scenarios, each interaction must be authorized in a specific context for a certain session for interaction. Those skilled in the art will recognize numerous ways in which the authorization information may be configured to limit interactions between the identity agent 20 and any number of receiving agents 16.

With reference now to FIGS. 2A through 2D, a communication flow is provided to illustrate various scenarios for asserting the identity of an entity associated with the asserting agent 14 to receiving agents 16A and 16B, respectively. The communication flows illustrate how authorization information provided by the asserting agent 14 may be used to control the interaction between the identity agent 20 and one of the receiving agents 16A, 16B according to different scenarios.

Figure 2A:
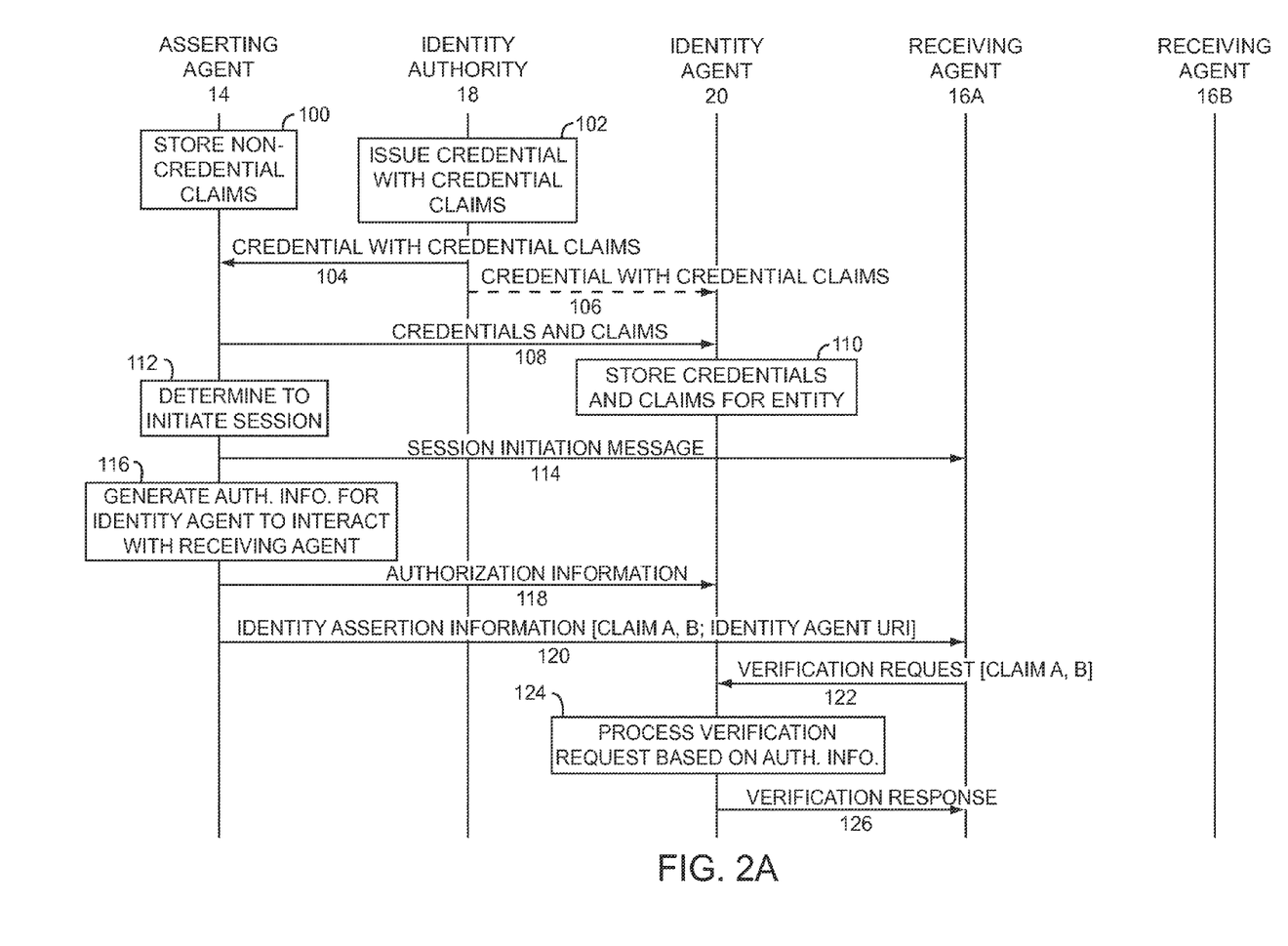
FIGS. 2A-2D show a communication flow illustrating multiple identity assertions according to various embodiments of the present invention.

With reference to FIG. 2A, assume that the asserting agent 14 receives and stores non-credential claims, which are claims that may not be associated with a particular credential (step 100). Further, assume that the identity authority 18 issues a credential with various credential claims (step 102), and delivers the credential with the credential claims to the asserting agent 14 (step 104). In certain embodiments, the identity authority 18 may be configured to deliver a credential and certain credential claims directly to the identity agent 20 upon authorization by the asserting agent 14, or other user terminal 12 associated with the entity (step 106). Alternatively, the asserting agent 14 may provide certain credentials and claims, either non-credential claims or credential claims, to the identity agent 20 (step 108). The identity agent 20 will store the credentials and claims for the entity (step 110). The identity agent 20 may also be provisioned by the entity to manage the claims and credentials, along with any other information desired by the entity. The entity may establish a control profile that allows the identity agent 20 to interact with the various receiving agents 16A, 16B and control such interaction in light of authorization information that is received directly from the asserting agent 14 or from the asserting agent 14 via the receiving agent 16A, 16B. As noted above, the identity agent 20 may be able to provide certain information to the receiving agents 16A, 16B as well as verify information for the receiving agents 16A, 16B, assuming such interactions are authorized by the asserting agent 14.

For the first scenario, the asserting agent 14 is asserting the identity of the entity associated with the asserting agent 14 to the receiving agent 16A. The receiving agent 16A will receive claims from the asserting agent 14 and request that the identity agent 20 verify the authenticity of these claims or other information associated with the entity based on the claims. The authorization information for the interaction between the identity agent 20 and the receiving agent 16A is passed directly to the identity agent 20 from the asserting agent 14.

Accordingly, the asserting agent 14 will determine to initiate a session with the receiving agent 16A (step 112) and send a session initiation message toward the receiving agent 16A (step 114). The asserting agent 14 will also generate authorization information, which will control how the identity agent 20 interacts with the receiving agent 16A (step 116). In this example, the asserting agent 14 will send the authorization information directly to the identity agent 20 (step 118). The authorization information may be provided for a single use, within a set amount of time, for a single interaction, within a defined context, or any combination thereof. In this example, assume that the authorization information at least allows the identity agent 20 to verify information that is associated with the entity in response to receiving the claim information for the entity from the receiving agent 16A.

Next, the asserting agent 14 may assert the identity of the entity to the receiving agent 16A by sending identity assertion information to the receiving agent 16A (step 120). The identity assertion information may include claims, such as Claim A and Claim B, or other related claim information, along with the identity or uniform resource identifier (URI) for the identity agent 20. As such, the receiving agent 16A can use the identity agent URI to send a verification request to verify certain information for the entity to the identity agent 20 (step 122). Assume that the verification request included claims A and B for the entity, and indicated the desire to verify these claims and certain other information associated with the entity. The identity agent 20 will receive the verification request and process the verification request based on the previously received authorization information (step 124). In this example, the identity agent 20 is authorized to process the verification request, wherein the verification request is based on claims of the entity. If the verification request does not correspond with the authorization provided in the authorization information, the identity agent 20 will limit the verification response or avoid interacting with the receiving agent 16A altogether. Since the identity agent 20 is authorized to interact with the receiving agent 16A in the illustrated example, a verification response is provided to the receiving agent 16A (step 126), which will process the verification response (step 128) and proceed as desired. In this example, the receiving agent 16A is configured to respond to the verification response by establishing a trust relationship and a session with the asserting agent 14 (step 130).

Figure 2B:
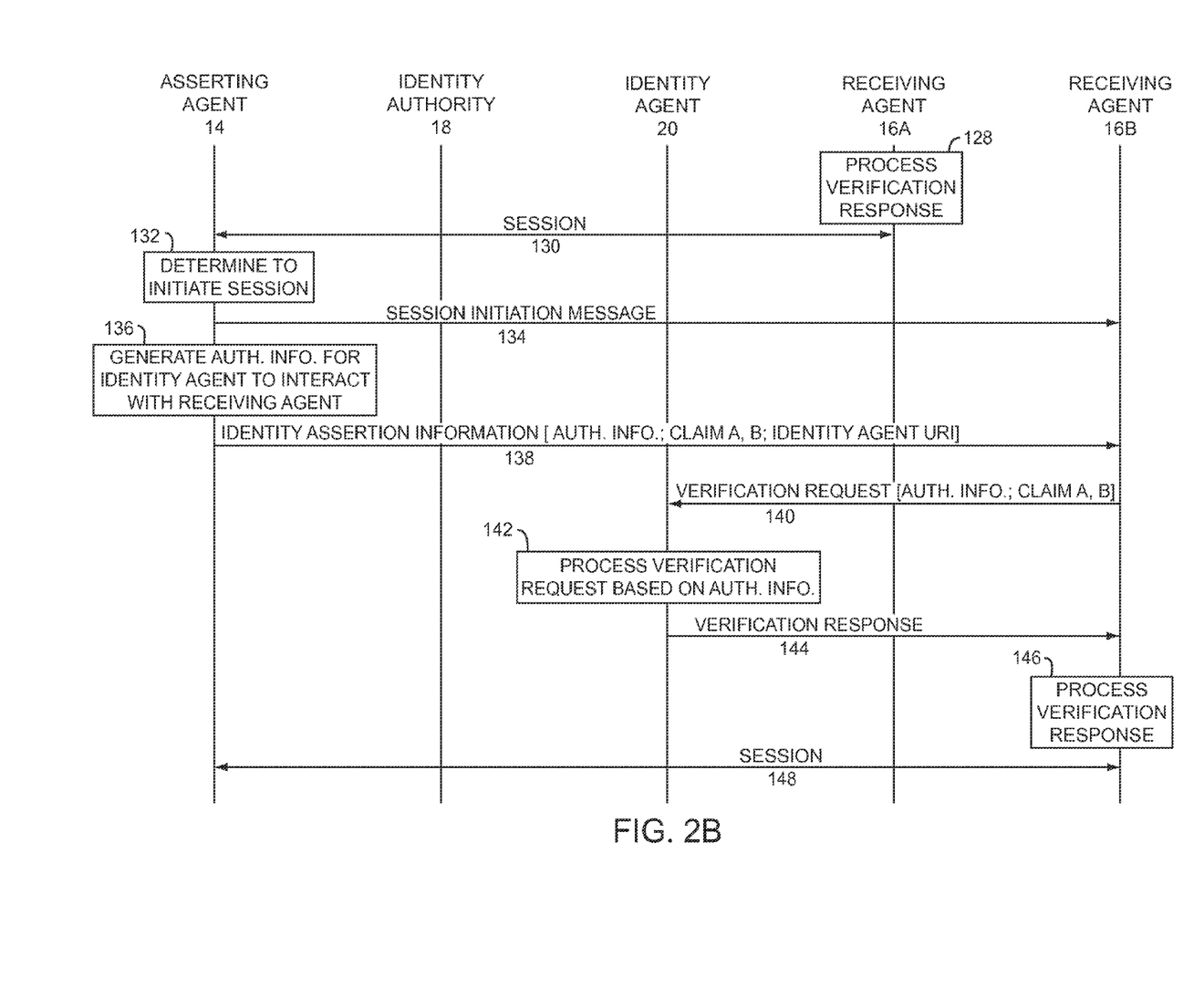

In the next scenario, the authorization information is not provided directly to the identity agent 20. Instead, the asserting agent 14 will provide the authorization information for controlling the interaction between the identity agent 20 and the receiving agent 16B directly to the receiving agent 16B. Further, the authorization information is provided along with the identity assertion information. Accordingly, the asserting agent 14 may determine to initiate a session with the receiving agent 16B (step 132) and send a session initiation message toward the receiving agent 16B (step 134). The asserting agent 14 will generate authorization information to control the interaction between the identity agent 20 and the receiving agent 16B (step 136) and deliver identity assertion information toward the receiving agent 16B (step 138). The identity assertion information is once again the vehicle for asserting the identity of the entity to the receiving agent 16B. The identity assertion information not only includes the claims A and B and the identity agent URI, but also includes the authorization information. The receiving agent 16B may once again send a verification request to verify claims A and B or other information associated with the entity based on claims A and B (step 140). The verification request may also include the authorization information, and as such, the identity agent 20 will recognize the authorization information and process the verification request based on the authorization information (step 142). Assuming an interaction is authorized with the receiving agent 16B for this scenario, the identity agent 20 will provide a verification response to the receiving agent 16B (step 144). The receiving agent 16B will process the verification response (step 146), and assuming the verification was positive, a session is established between the asserting agent 14 and the receiving agent 16B (step 148). Although the authorization information is shown as being carried in the identity assertion information as well as in the verification request, the authorization information may be provided in the same or different messages as the identity assertion information and verification request.

Figure 2C:
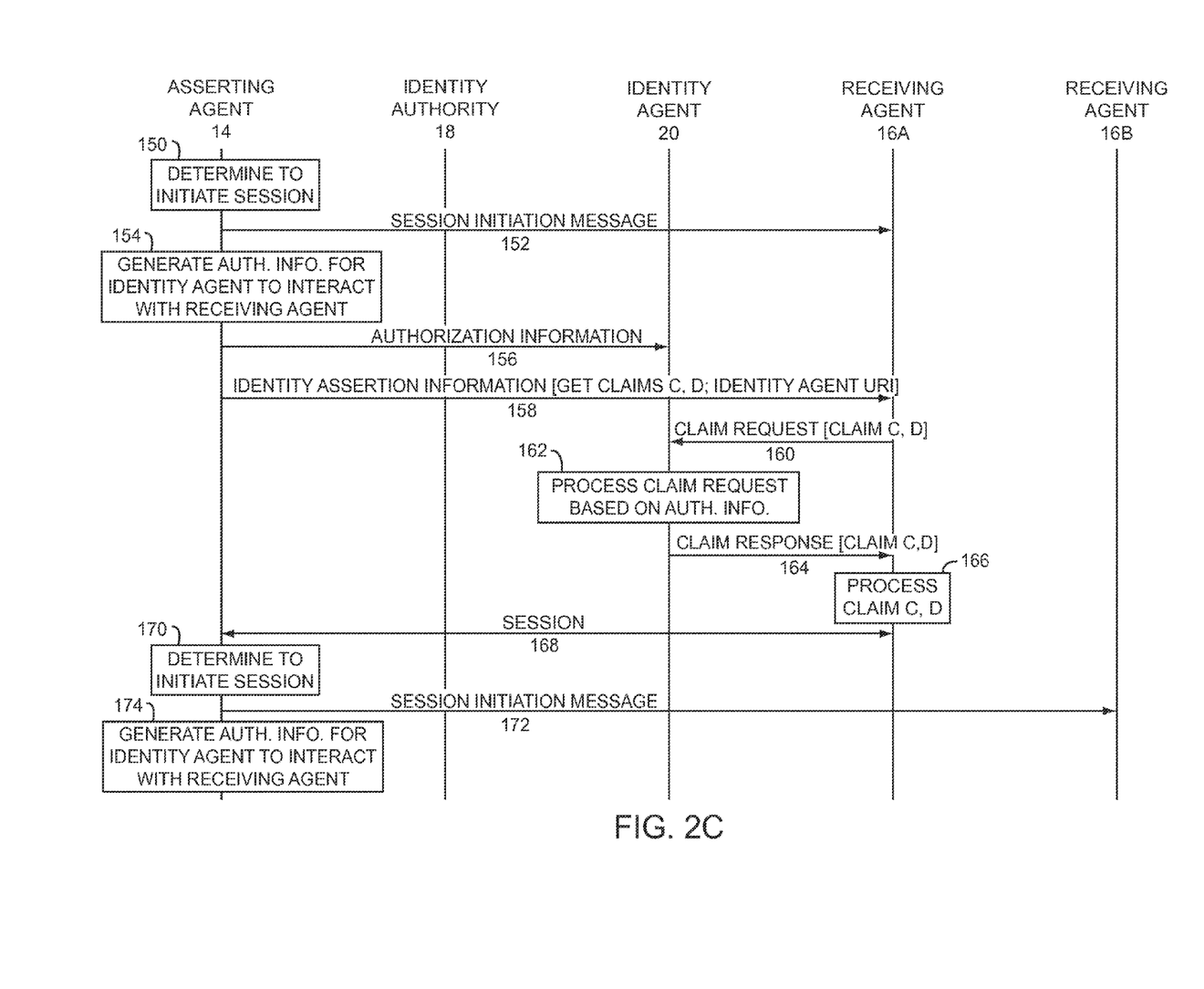

For the next scenario, the authorization information is delivered directly to the identity agent 20; however, the identity agent 20 is capable of delivering information, such as claims for the entity, to the receiving agent 16A. Accordingly, the asserting agent 14 may determine to initiate a session with the receiving agent 16A (step 150), and send the corresponding session initiation message toward the receiving agent 16A (step 152). Again, the asserting agent 14 will generate authorization information to control the interaction between the identity agent 20 and the receiving agent 16A (step 154), and send the authorization information directly to the identity agent 20 (step 156).

In this example, the asserting agent 14 does not store certain claims associated with the entity, but recognizes that these claims are provided by the identity agent 20. Accordingly, the asserting agent 14 will assert the identity of the associated entity to the receiving agent 16A using identity assertion information (step 158). The identity assertion information may include information indicating that claims C and D are available (GET CLAIMS C, D) from the identity agent 20 using the identity agent URI. Upon receiving the identity assertion information, the receiving agent 16A may send a claim request to the identity agent 20 to obtain claims C and D (step 160). The identity agent 20 will process the claim request based on the authorization information (step 162). Assuming the claim request was authorized by the asserting agent 14, the identity agent 20 will access claims C and D of the entity and provide them in a claim response to the receiving agent 16A (step 164). The receiving agent 16A may process the claims C and D (step 166), and if so desired, continue with establishing a trustworthy relationship and session with the asserting agent 14 (step 168).

Figure 2D:
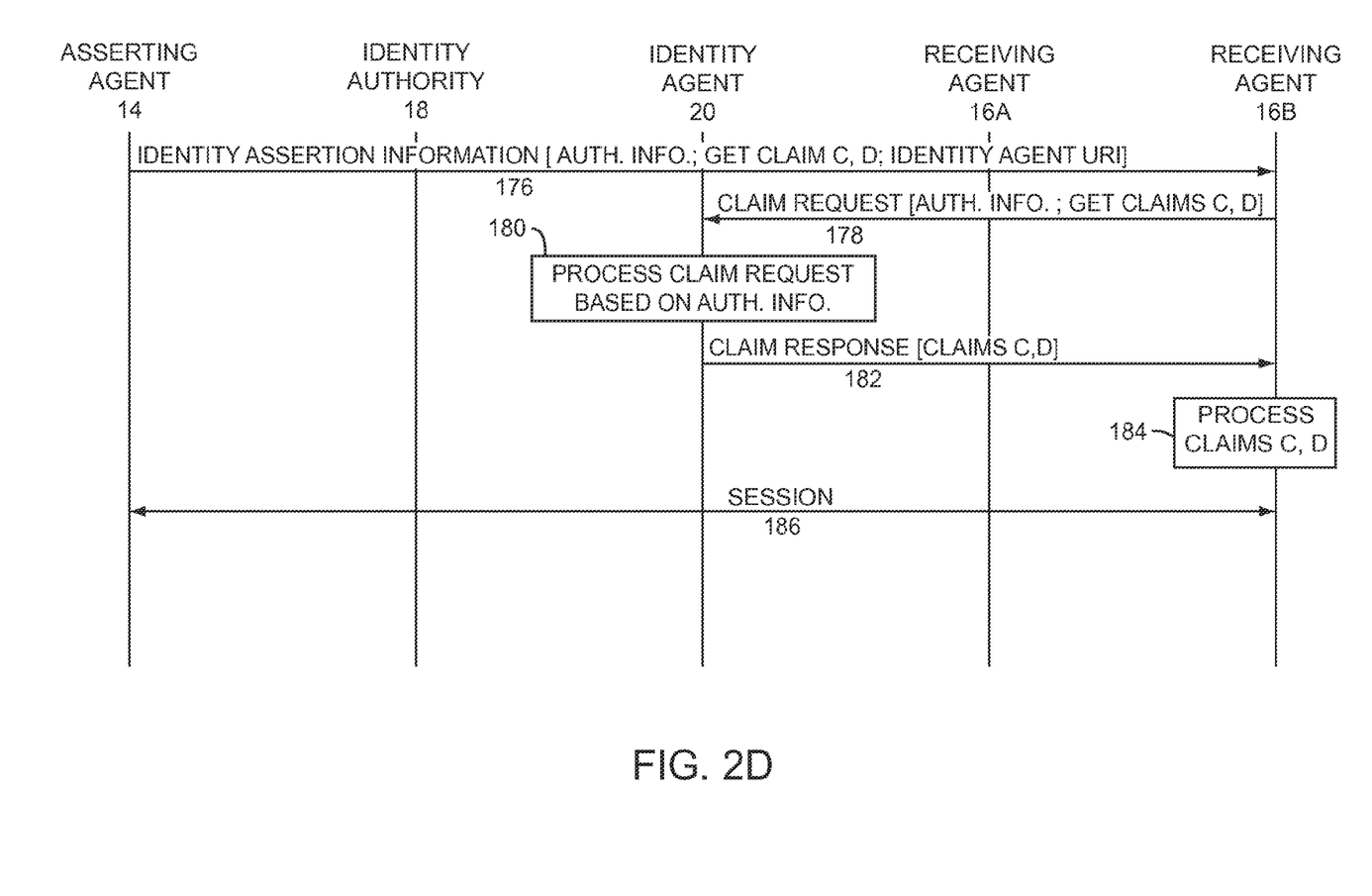

For the final scenario, assume that the authorization information from the prior example is sent to the receiving agent 16B in the identity assertion information, instead of being sent directly to the identity agent 20. Thus, the receiving agent 16B must present the authorization information to the identity agent 20. Continuing with the communication flow, assume that the asserting agent 14 determines to initiate a session with the receiving agent 16B (step 170) and sends a session initiation message toward the receiving agent 16B (step 172). The asserting agent 14 may generate the appropriate authorization information to control the interaction of the identity agent 20 and the receiving agent 16B (step 174), and provide the authorization information along with the assertion information to the receiving agent 16B (step 176). As in the prior example, the identity assertion information asserts the information for the entity by instructing the receiving agent 16B to get claims C and D from the identity agent 20 using the identity agent URI. The receiving agent 16B will generate a claim request, which includes the authorization information and instructions to obtains claims C and D, and will send the claim request to the identity agent 20 (step 178). The identity agent 20 will process the claim request based on the authorization information (step 180), and if the interaction between the identity agent 20 and the receiving agent 16B is authorized, the identity agent 20 will provide a claim response, which includes claims C and D, to the receiving agent 16B (step 182). The receiving agent 16B will process claims C and D, and any other information received from the identity agent 20 (step 184), to determine whether to establish a trustworthy relationship with the asserting agent 14 and a session therewith (step 186).

In the above examples, the identity assertion was provided in association with initiating a session from the asserting agent 14. Those skilled in the art will recognize that an identity assertion may take place prior to initiating a session or after a session has been established. Further, the asserting agent 14 need not be the agent that initiates a session with which the identity assertion is associated.

With the present invention, claims or credentials that are used for identity assertion may be stored in the asserting agent 14, the identity agent 20, or a combination thereof. In certain scenarios, the asserting agent 14 will store all of the claims or credentials necessary for interactions initiated by the asserting agent 14. In other scenarios, the claims and credentials may all be stored at the identity agent 20, while the asserting agent 14 does not store any credentials or claims. In other scenarios, the claims may be distributed between the asserting agent 14 and the identity agent 20. Accordingly, the receiving agent 16 may use claims received from the asserting agent 14 to verify certain information for the entity, as well as receive claims that are not stored on the asserting agent 14 from the identity agent 20. Further, multiple identity agents 20 may be used to store different credentials or claims for a given entity. As such, the credentials or claims are distributed among various identity agents 20. To verify information for the entity or obtain credentials or claims for the entity, a receiving agent 16 may be required to interact with different ones of the identity agents 20 for a particular identity assertion. In such a scenario, the credentials and claims for an identity of an entity are substantially safeguarded, especially when the credentials or claims that are stored on the asserting agent 14 are limited. In these scenarios, different authorization information may be created for different identity agents 20, wherein different identity agents 20 are able to provide different identity assertion functions for the receiving agent 16.

Figure 3:
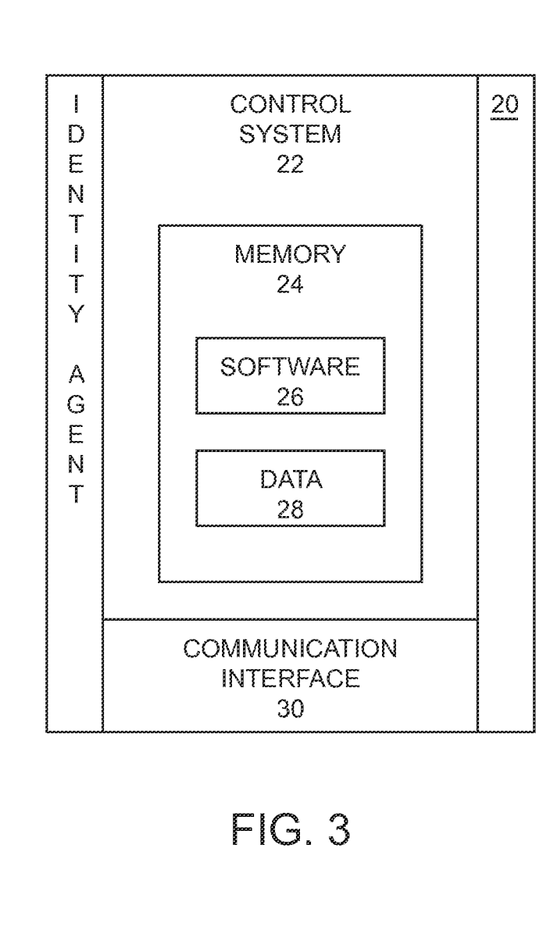
FIG. 3 is a block representation of an identity agent according to one embodiment of the present invention.

With reference to FIG. 3, a block representation of an identity agent 20 is illustrated according to one embodiment of the present invention. The identity agent 20 may include a control system 22 having sufficient memory 24 for the requisite software 26 and data 28 to operate as described above. The control system 22 may also be associated with a communication interface 30 to facilitate communications over the communication network 10.

Figure 4:
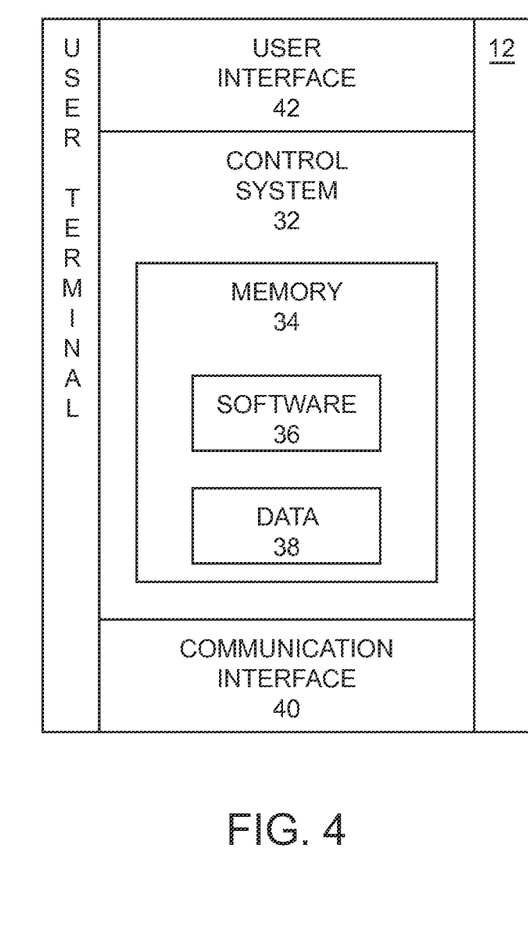
FIG. 4 is a block representation of a user terminal according to one embodiment of the present invention.

With reference to FIG. 4, a user terminal 12 is illustrated according to one embodiment of the present invention. The user terminal 12 may include a control system 32 having sufficient memory 34 for the requisite software 36 and data 38 to provide an asserting agent 14 or a receiving agent 16, as described above. The control system 32 may be associated with a communication interface 40 to facilitate communications over the communication network 10 in a direct or indirect fashion. Further, the control system 32 may be associated with a user interface 42 to facilitate interaction with the user, as well as support communication sessions with other user terminals 12. Thus, the user interface 42 may include a microphone, speaker, keyboard, display, and the like, which operate in traditional fashion for traditional functionality.

Those skilled in the art will recognize improvements and modifications to the preferred embodiments of the present invention. All such improvements and modifications are considered within the scope of the concepts disclosed herein and the claims that follow.

What is claimed is:

1. A method for operating a computer implemented identity agent comprising:
   receiving, at the identity agent, identity information comprising one or more claims corresponding to a credential, wherein the identity information is received from a user;
   receiving, at the identity agent through a computer controlled communication medium, authorization information originated from an asserting agent associated with the user,
      wherein the authorization information is received in association with the asserting agent asserting an identity to a receiving agent, and
      wherein the authorization information is configured to control an identity-related interaction between the identity agent and the receiving agent;
   receiving, at the identity agent from the receiving agent, a request for information related to at least one claim among the one or more claims, the information related to the at least one claim among the one or more claims comprising at least one from the group consisting of: the at least one claim among the one or more claims and a verification of the at least one claim among the one or more claims;
   determining, by the identity agent based on the authorization information, whether to transmit the information related to the at least one claim among the one or more claims to the receiving agent in response to the request.

2. The method of claim 1 wherein the authorization information is configured to authorize a single identity-related interaction between the identity agent and the receiving agent.

3. The method of claim 1 wherein the authorization information is configured to authorize at least one identity-related interaction between the identity agent and the receiving agent for a limited duration.

4. The method of claim 1 wherein the authorization information is configured to authorize identity-related interactions between the identity agent and only the receiving agent.

5. The method of claim 1 wherein the authorization information is configured to authorize at least one identity-related interaction for a defined purpose between the identity agent and the receiving agent.

6. The method of claim 1 wherein the asserting agent is asserting the identity to the receiving agent in association with a session established or to be established between the asserting agent and the receiving agent, the authorization information configured to authorize at least one identity-related interaction between the identity agent and the receiving agent if the session is of a certain type.

7. The method of claim 1 wherein the authorization information is configured to authorize at least one identity-related interaction for a defined purpose and for a limited duration.

8. The method of claim 1 wherein the authorization information is configured to authorize only a single identity-related interaction for a defined purpose and for a limited duration.

9. The method of claim 1 wherein obtaining the authorization information comprises receiving the authorization information from the asserting agent.

10. The method of claim 1 wherein the authorization information is provided to the receiving agent from the asserting agent, and obtaining the authorization information comprises receiving the authorization information from the receiving agent.

11. The method of claim 1 wherein receiving the request for information related to the at least one claim among the one or more claims comprises receiving a request to transmit at least one claim that is associated with the user among the one or more claims to the receiving agent, and
   wherein determining, based on the authorization information, whether to transmit information related to the at least one claim among the one or more claims to the receiving agent comprises determining to transmit the at least one claim among the one or more claims to the receiving agent if the authorization information allows the at least one claim to be provided to the receiving agent.

12. The method of claim 1 wherein receiving the request for information related to the at least one claim among the one or more claims comprises receiving a request to verify at least one claim that is associated with the user among the one or more claims to the receiving agent, and
   wherein determining, based on the authorization information, whether to transmit information related to the at least one claim among the one or more claims to the receiving agent comprises determining to verify the at least one claim among the one or more claims to the receiving agent if the authorization information allows the at least one claim to be verified to the receiving agent.

13. The method of claim 1 further comprising:
   identifying only select ones of the one or more claims to use for responding to the request based on the authorization information; and
   providing the select ones of the one or more claims to the receiving agent.

14. The method of claim 1 further comprising:
   generating claim-related information based on at least one of the one or more claims based on the authorization information; and
   providing the claim-related information to the receiving agent.

15. The method of claim 1 wherein the asserting agent is provided by a first user terminal.

16. The method of claim 1 wherein the receiving agent is provided by a first user terminal.

17. The method of claim 1 wherein an entity is associated with a plurality of identity-related claims, and a first group of the plurality of identity-related claims are stored on the asserting agent and a second group of the plurality of identity-related claims are stored on the identity agent and not the asserting agent, wherein the identity-related interaction involves the second group of the plurality of identity-related claims.

18. The method of claim 17 wherein the first group of the plurality of identity-related claims are provided to the receiving agent by the asserting agent.

19. The method of claim 1 wherein the authorization information is configured to control an identity-related interaction between the identity agent and the receiving agent by authorizing on behalf of the user whether the information related to the at least one claim among the one or more claims may be transmitted from the identity agent to the receiving agent.

20. The method of claim 1 further comprising transmitting the information related to the at least one claim among the one or more claims from the identity agent to the receiving agent if the authorization information allows the information related to the at least one claim among the one or more claims to be provided to the receiving agent.

21. The method of claim 1 wherein the authorization information is distinct from the one or more claims.

22. The method of claim 1 wherein the authorization information initially originated from the asserting agent associated with the user.

23. An identity agent comprising:
a communication interface; and
a control system associated with the communication interface and adapted to:
  receive identity information comprising one or more claims corresponding to a credential, wherein the identity information is received from a user;
  receive authorization information originated from an asserting agent associated with the user,
    wherein the authorization information is received in association with the asserting agent asserting an identity to a receiving agent, and
    wherein the authorization information is configured to control an identity-related interaction between the identity agent and the receiving agent;
  receive, from the receiving agent, a request for information related to at least one claim among the one or more claims, the information related to the at least one claim among the one or more claims comprising at least one from the group consisting of: the at least one claim among the one or more claims and a verification of the at least one claim among the one or more claims; and
  determine, based on the authorization information, whether to transmit the information related to the at least one claim among the one or more claims to the receiving agent in response to the request.

24. A computer implemented method comprising:
receiving, at a computer implemented identity agent, identity information comprising one or more claims corresponding to a credential, wherein the identity information is received from a user;
  receiving, at the computer implemented identity agent, over a communication network, authorization information originated from an asserting agent associated with the user,
    wherein the authorization information is received in association with the asserting agent asserting an identity to the receiving agent, and
    wherein the authorization information is configured to control an identity-related interaction between the computer implemented identity agent and a receiving agent;
  receiving, at the computer implemented identity agent from the receiving agent, a request for information related to at least one claim among the one or more claims, the information related to the at least one claim among the one or more claims comprising at least one from the group consisting of: the at least one claim among the one or more claims and a verification of the at least one claim among the one or more claims;
  determining, by the computer implemented identity agent based on the authorization information, whether to transmit the information related to the at least one claim among the one or more claims to the receiving agent in response to the request.

25. The method of claim 24 wherein receiving the request for information related to the at least one claim among the one or more claims comprises receiving a request to transmit at least one claim that is associated with the user among the one or more claims to the receiving agent, and
wherein determining, based on the authorization information, whether to transmit information related to the at least one claim among the one or more claims to the receiving agent comprises determining to transmit the at least one claim among the one or more claims to the receiving agent if the authorization information allows the at least one claim to be provided to the receiving agent.

26. The method of claim 24 wherein receiving the request for information related to the at least one claim among the one or more claims comprises receiving a request to verify at least one claim that is associated with the user among the one or more claims to the receiving agent, and
wherein determining, based on the authorization information, whether to transmit information related to the at least one claim among the one or more claims to the receiving agent comprises determining to verify the at least one claim among the one or more claims to the receiving agent if the authorization information allows the at least one claim to be verified to the receiving agent.

27. The method of claim 24 wherein receiving the authorization information originated from the asserting agent comprises receiving the authorization information from the asserting agent.

28. The method of claim 24 wherein the authorization information is provided to the receiving agent from the asserting agent, and receiving the authorization information originated from the asserting agent comprises receiving the authorization information from the receiving agent.

29. A method comprising:
at a computer implemented identity agent, receiving, from a user, identity information comprising one or more claims capable of being verified from a credential;
storing the identity information for subsequent use;
receiving authorization information distinct from the one or more claims that controls when and how the computer implemented identity agent may interact with a receiving agent, wherein the authorization information originated from an asserting agent associated with the user and wherein the authorization information was generated in conjunction with the asserting agent asserting an identity to the receiving agent;
at the computer implemented identity agent, receiving a request from the receiving agent, wherein the request comprises a request selected from the group consisting of: a request for at least one claim and a request for verification of at least one claim; and determining, by the computer implemented identity agent, based on the authorization information, whether to respond to the request by transmitting one of a response to the request for at least one claim or a response to the request for verification of at least one claim to the receiving agent.

* * * * *